United States Patent [19]

Kustanovich

[11] Patent Number: 4,644,801

[45] Date of Patent: Feb. 24, 1987

[54] SURFACE-AREA PRESSURE TRANSDUCER AND LINE-SELECTION CIRCUIT FOR USE THEREWITH

[75] Inventor: Yosef Kustanovich, Rehovot, Israel

[73] Assignee: Cybertronics Ltd., Tel-Aviv, Israel

[21] Appl. No.: 767,891

[22] Filed: Aug. 21, 1985

[30] Foreign Application Priority Data

Aug. 21, 1984 [IL] Israel ......................... 72736

[51] Int. Cl.⁴ ........................... G01D 7/02; H01G 7/00
[52] U.S. Cl. .................................... 73/862.04; 73/172; 361/283
[58] Field of Search ............... 73/172, 862.04, 862.64, 73/862.68, 780, 724; 178/18; 340/365 A, 365 C; 361/280, 283, 291, 324; 200/DIG. 1; 177/210 C

[56] References Cited

U.S. PATENT DOCUMENTS

| | | | |
|---|---|---|---|
| 3,565,195 | 2/1971 | Miller | 177/210 C |
| 4,134,063 | 1/1979 | Nicol et al. | 324/61 R |
| 4,405,917 | 9/1983 | Chai | 340/365 C |
| 4,437,138 | 3/1984 | Nicol | 361/283 |
| 4,526,043 | 7/1985 | Boie et al. | 73/862.04 |
| 4,581,677 | 4/1986 | Hruby et al. | 361/283 |

Primary Examiner—Charles A. Ruehl

[57] ABSTRACT

A surface-area-pressure transducer comprises: at least one pair of electrode layers each including a plurality of electrically-conductive elements, the elements of one layer extending in spaced, crossing relationship to the elements of the other layer; and a compressively-deformable dielectric layer composed of fibers interposed between the two electrode layers to define therewith an array of capacitors whose capacitances are changed by the compression of said dielectric layer when subjected to pressure. Also described is a line-selector circuit for individually selecting each capacitor for measurement without electrical cross-talk from the other capacitors.

19 Claims, 5 Drawing Figures

SURFACE-AREA PRESSURE TRANSDUCER AND LINE-SELECTION CIRCUIT FOR USE THEREWITH

BACKGROUND OF THE INVENTION

The present invention relates to surface-area pressure transducers, namely to transducers which measure pressure distribution over a surface area. The invention also relates to a line selection circuit for use with such transducers.

Surface-area-pressure transducers have found a number of applications. One application is for measuring the pressure distribution between the planar surface of the foot and the insole of a shoe during walking or running. Such information is useful in the treatment of various disorders of the lower limb, in the design of footwear, and also in training for sports.

One known surface-area-pressure transducer of this type is in the form of a pressure pad consisting of a flexible array of foam-rubber parallel-plate capacitors whose capacitances change as they deform under load during the course of walking or running. However, such foam-rubber pressure pads have a number of disadvantages. One disadvantage is the mechanical "cross-talk", namely the influence of those capacitors in the pad which are subjected to the local pressure, on the outputs of those capacitors not subjected to local pressure; thus, a compressive pressure applied between a pair of surfaces at one discrete location on the pressure pad tends to produce extensions in the non-pressurized contiguous portions of the pad, thereby changing their capacitance. Other disadvantages in the foam-rubber type pressure pad are that foam-rubber exhibits a non-linear stress-strain curve and also some mechanical hysteresis, both of which affect the outputs of the transducer. Such transducers have therefore not been found satisfactory particularly when dynamic measurements are to be taken.

Another surface-area-pressure transducer devised to minimize the above effects of the foam-rubber transducer is of the piezoelectric type including a flexible array of piezoelectric elements, such as lead zirconate titanate, embedded in a thick layer of resilient, insulating silicone rubber. This type of transducer is described, for example, in *J. Biomed Eng*, 1982, volume 4, July, pp. 213-221. However, such a transducer is very expensive to construct; moreover, its flexibility is poor for many applications.

An object of the present invention is to provide a novel surface-area-pressure transducer having advantages in the above respects. Another object of the invention is to provide a line selection circuit usable with the novel transducer for substantially reducing electrical "cross-talk" between the capacitors.

SUMMARY OF THE INVENTION

According to a broad aspect of the present invention, there is provided a surface-area-pressure transducer comprising: at least one pair of electrode layers each including a plurality of electrically-conductive elements, the elements of one layer extending in spaced, crossing relationship to the elements of the other layer; and a compressively-deformable dielectric layer interposed between the two electrode layers to define therewith an array of capacitors whose capacitances are changed by the compression of the dielectric layer when subjected to pressure; characterized in that the dielectric layer is composed of fibers selected from the group consisting of nylon, glass and paper.

It has been found that such a construction provides a number of important advantages over the previously-known transducers briefly discussed above. Preferred examples of fibrous materials that could be used include woven nylon and glass, and non-woven paper and glass. These materials have been found to substantially eliminate mechanical cross-talk between adjacent capacitors and mechanical hysteresis and to substantially reduce the relaxation time, when compared to the foam-rubber type transducer mentioned earlier. In addition, the novel construction provides transducers of substantially higher flexibility and substantially lower cost than the piezoelectric type tranducer mentioned earlier.

According to another aspect of the invention, there is provided a selector circuit for selectively connecting the individual capacitors of the array to a measuring device in a manner which eliminates electrical "cross-talk" between the capacitors.

Further features and advantages of the invention will be apparent from the description below

BRIEF DESCRIPTION OF THE DRAWINGS

The invention is herein described, by way of example only, with reference to the accompanying drawings, wherein.

DECRIPTION OF PREFERRED EMBODIMENTS

Figure 1:
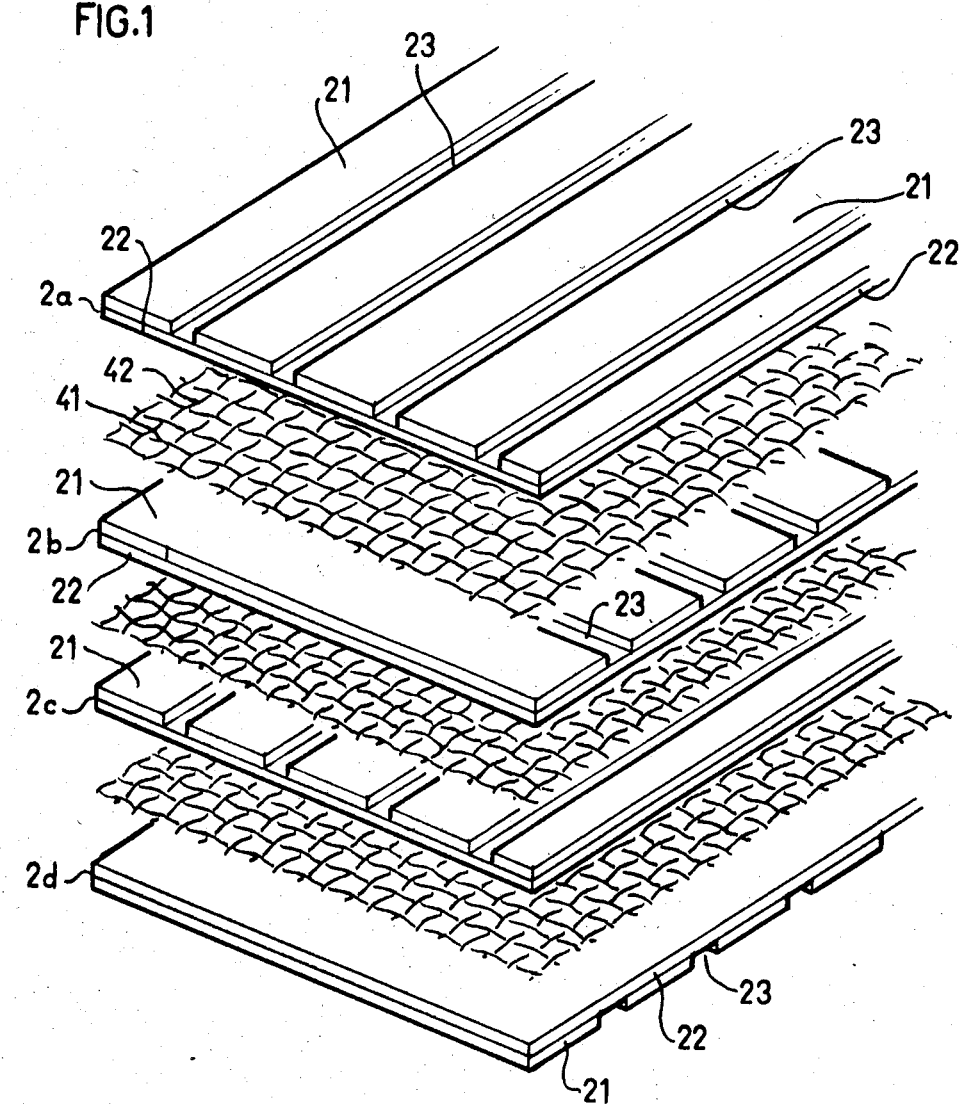
FIG. 1 is an exploded perspective view illustrating one form of surface-area-pressure transducer constructed in accordance with the present invention.
Figure 2:
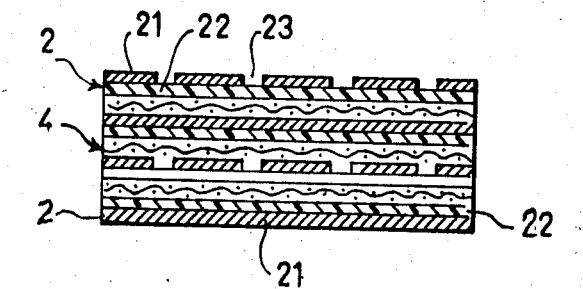
FIG. 2 is a transverse sectional view of the transducer illustrated in FIG. 1.

The surface-area pressure transducer illustrated in FIGS. 1 and 2 comprises a plurality of electrode layers $2a$, $2b$, $2c$, $2d$ separated from each other by a dielectric layer 4. Each dielectric layer is of compressively-deformable material, such that the illustrated assembly produces an array of parallel-plate capacitors whose capacitances change according to the pressure applied at the respective location of each capacitor in the array, thereby providing a measurement of the pressure distribution over the surface of the pressure transducer.

More particularly, electrode layer $2a$ is comprised of a plurality of electrically-conductive strips 21 supported in parallel spaced relationship on a substrate 22, each strip being spaced from the adjacent one by a small gap 23. The next adjacent electrode layer $2b$ is similarly formed with a plurality of electrically-conductive elements 21 supported on a substrate 22 and spaced from each other by small gaps 23. The electrically-conductive elements 21 in electrode layer $2b$ are also in parallel relationship to each other, but are arranged perpendicularly (or other crossing relationship) to the electrically-conductive elements 21 in electrode layer $2a$. The next adjacent electrode layer $2c$, separated from electrode layer $2b$ by a dielectric layer 4, is of similar construction as electrode layer 2a; electrode layer 2d is of similar construction as electrode layer 2b; and so on for as many electrode layers as there are in the transducer.

The electrically-conductive elements 21 in the electrode layers 2a–2d are prefereably strips of metal foil, such as copper or aluminum, and their respective substrates 22, are preferably thin flexible films of plastic material to which the metal strips are bonded. Such electrode layers can be produced inexpensively in volume by known printed-circuit techniques, for example. The electrically-conductive strips 21 may also be coatings of metal paint applied, e.g. by mask-spraying or vacuum evaporation techniques, to their respective substrates 22.

While the electrically-conductive strips 21, of the electrode layers 2a–2d are preferably applied to their respective substrates 22, which are in turn bonded to the intermediate dielectric layers 4, it is contemplated that the strips may also be applied directly to the dielectric layers 4. In addition, the strips may be applied on the inner faces of their respective layers.

Each dielectric layer 4 is composed of fibers exhibiting a volume change substantially linear with pressure, substantially no hysteresis, and a very short relaxation time. Examples of such materials are fibers of nylon, glass or paper, in non-woven or woven form. The latter is illustrated in FIGS. 1 and 2. Thus, each layer includes a plurality of warp threads 41 running in one direction, and a plurality of weft threads 42 running perpendicularly to the warp threads.

Corresponding electrodes in alternate electrode layers are electrically connected to each other. Thus, the first electrode in layer 2a is connected to the first electrode in layer 2c, the first electrode in layer 2b is connected to the first electrode in layer 2d, and so forth. It will thus be seen that a transducer constructed as illustrated in FIGS. 1 and 2 will provide an array of parallel-plate capacitors equal to the number of electrically-conductive elements 21 in the electrode layer 2a multiplied by the number of electrically-conductive elements 21 in electrode layer 2b. Thus, if each such layer includes 16 electrically-conductive elements, the transducer produced will form an array of 256 capacitors. Their capacitances will change by the deformation of the dielectric layers 4 according to the distribution of the pressure applied to the transducer, such that the transducer produces an output representative of the pressure distribution over the transducer.

Figure 5:
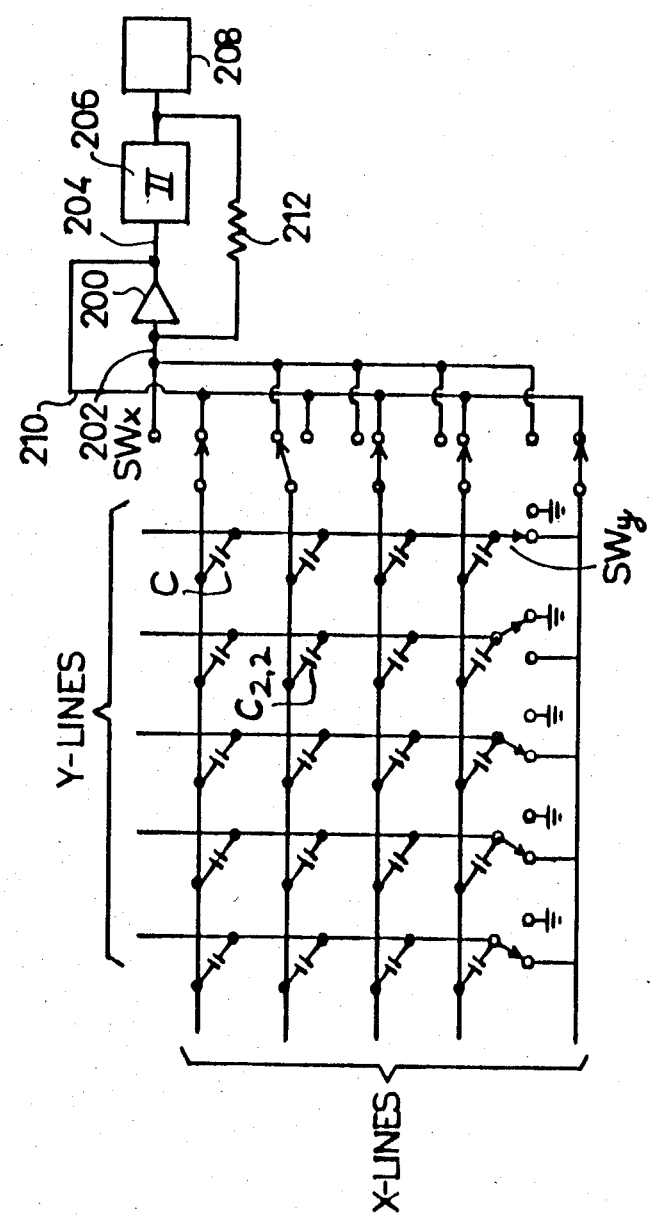
FIG. 5 illustrates a line selection circuit for selectively connecting the individual capacitors of the array in the pressure transducer of FIGS. 1-4 to a measuring device.

Techniques are known for reading out the variations in the capacitances of the array when subjected to a pressure. For example, the capacitances could be read out by a scanning circuit which sequentially scans all the capacitors by successively selecting each horizontal row and vertically scanning all the vertical columns in a each row. FIG. 5, described below, illustrates a preferred line selection circuit which may be used for this purpose.

It has been found that the transducer construction illustrated in FIGS. 1 and 2 is characterized by no significant mechanical cross-talk as compared to the known foam-rubber type transducer mentioned earlier. Thus, whereas in the foam-rubber type transducer compressive pressures applied between surfaces at specific locations on the transducer tend to produce axial and radial extensions in the adjacent non-pressurized portions of the transducer not subjected to the local pressure, this effect is substantially eliminated in the transducer construction illustrated in FIGS. 1 and 2 since the interstices between the threads in the dielectric layer 4 tends to accommodate the compressive deformations at the locally-applied pressure points without producing axial or radial extensions in the adjacent areas not subjected to the local pressure, or subjected to different degrees of local pressure. In addition, the transducer illustrated in FIGS. 1 and 2 has been found to exhibit no significant mechanical hysteresis, and a substantially linear stress-strain relationship, as compared to the foam-rubber type transducer. Further, the illustrated transducer can be constructed to be substantially more flexible and at substantially lower cost as compared to the known piezoelectric type transducer mentioned earlier.

Figure 3:
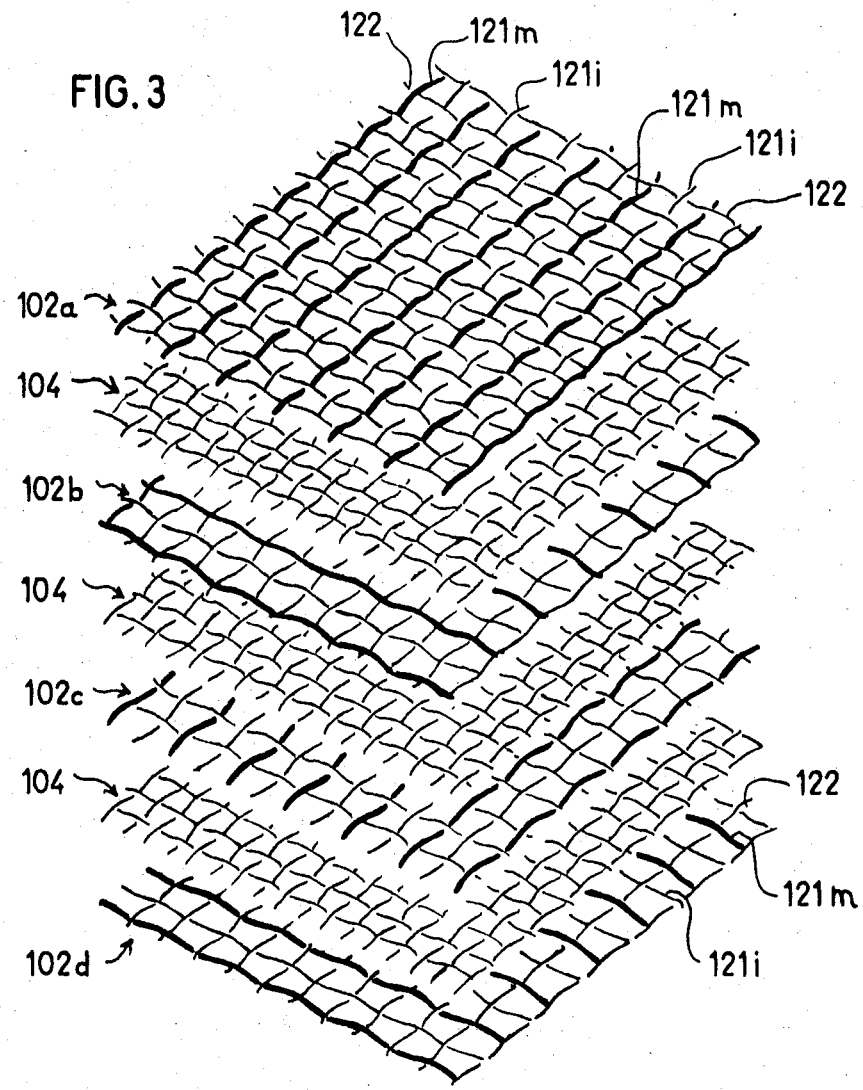
FIG. 3 is an exploded perspective view illustrating a second form of surface-area-pressure transducer constructed in accordance with the present invention.
Figure 4:
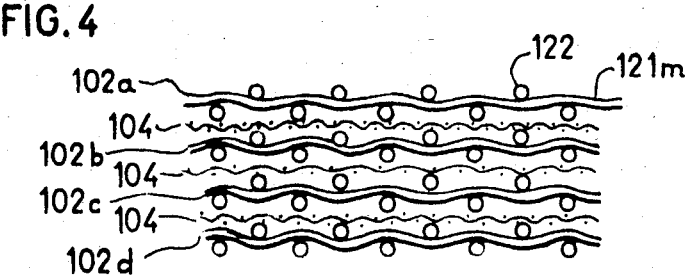
FIG. 4 is a transverse sectional view of the transducer of FIG. 3.

FIGS. 3 and 4 illustrate another surface-area-pressure transducer constructed in accordance with the invention. The transducer illustrated in FIGS. 3 and 4 also includes a plurality of electrode layers 102a–102d formed with intermediate dielectric layers 104 and defining therewith an array of parallel-plate capacitors. In the arrangement of FIGS. 3 and 4, however, the electrode layers 102a–102d are also woven, each being each comprised of a plurality of threads extending in one direction interwoven with a plurality of threads extending in another direction. Some of the threads in the one direction are of electrically-conductive material, whereas the remaining threads in that direction and all the threads in the opposite direction are of electrically-insulating material.

Thus, electrode layer 102a is comprised of a plurality of warp threads 121m, 121i extending in one direction, interwoven with a plurality of weft threads 122 extending at right angles to the warp threads. Each alternate warp threads 121m is a metal (e.g. copper) strand, as indicated by threads 121m, whereas the remaining warp threads 121i are of insulating material, such as of a natural or synthetic fiber, e.g., nylon or glass. Alternatively, the metal threads may be metal-coated plastic, or plastic-coated metal; in the latter case, there is no need for the separate insulating threads 121i. All the weft threads 122 are of insulating material, e.g. of the same material as the warp threads 121i. The next adjacent electrode layer 102b is similarly constructed of a plurality of warp threads 121 interleaving with a plurality of weft threads 122, alternates ones of the warp threads being of metal and insulating material, as shown at 121m and 121i, respectively, whereas all the weft threads are of insulating material.

A plurality, e.g. 2 or 3, of the metal threads 121m in each layer are electrically connected together to form the equivalent of a plurality of parallel conductor strips each separated by an insulating thread 121i. The corresponding conductor strips in layers 102a and 102c are electrically connected together, and similarly the corresponding conductor strip in layers 102b and 102d are electrically connected together.

It will thus be seen that the metal strands 121m in electrode layers 102a–102d, respectively, serve the same function as the metal foil strips 21 of layers 2a–2d in the FIGS. 1 and 2 embodiment, in defining the electrodes of the array of capacitors produced by this construction. However, since the electrode layers 102a–102d are also of the interwoven-thread arrangement described above with respect to the dielectric layer 4 in the FIGS. 1 and 2 embodiment, the construction in FIGS. 3 and 4 has been found to further increase flexibility as compared to the previously known transducers of this type.

FIG. 5 illustrates a circuit particularly useful in connecting the transducer of either FIGS. 1,2 or 3,4, to a measuring device for individually measuring the capacitance of each capacitor in the array.

Thus, as shown in FIG. 5, the transducer constructed as described above includes the equivalent of a plurality of X-lines, a plurality of Y-lines, and electrical connections connecting each of the capacitors, schematically indicated at C, of the array between the cross-over point of one of the X-lines and one of the Y-lines.

In the illustrated circuit, each of the X-lines is connected to a bistable switching device SWx, and similarly each of the Y-lines is connected to a bistable switching device SWy. Each switching device SWx selectively connects its X-line to the input line 202 of a buffer amplifier 200, or to another line 210 connected to the output line 204 of amplifier 200. Each of the Y-line switches SWy selectively connects its Y-line to line 210 or to ground.

Buffer amplifier 200 serves as a voltage follower, having a high input impedance and a gain of "1". Its output 204 is connected to a two threshold bistable device, such as a Schmidt trigger. The trigger remains in one stable state until its input voltage reaches a threshold value, at which time it triggers to its other state. For example, when the input is low, its output remains high until the input reaches the upper threshold, at which time it switches to its other stable state wherein its output is low and remains low until its input reaches the lower threshold.

The output of bistable device 206 is connected via electrical resistor 212 to the juncture of line 202 with the input to the buffer amplifier 200. The juncture of the output of bistable device 206 with resistor 212 is connected to a computer 208.

Line 202 connected in series with resistor 212 to the output end of bistable 206 is termed a capacitance measuring line since it is included in the capacitor charging-/discharging circuit with resistor 212. Line 210, being connected to the output of the unity gain amplifier 200, receives the same voltage as in the measuring line 202 but, because of the high input impedance of amplifier 200, it is isolated from the current flow through the measuring line 202; line 210, therefore, is called a neutralizing line, since it neutralizes the non-selected capacitors from influencing the measurement of the selected capacitor via the measuring line 202 and the capacitance charging-discharging resistor 212.

The circuit illustrated in FIG. 5 operates as follows:

The selection of a particular capacitors C within the matrix illustrated in FIG. 5, for measurement of its capacitance, is effected by actuating a selected switch $SW_X$ in the X-lines and a selected switch $SW_Y$ in the Y-lines. This selection of the individual capacitors is by computer 208 which issues a command to actuate the $SW_X$ and $SW_Y$ switches for the selected capacitor. In the example illustrated in FIG. 5, it will be seen that capacitor $C_{2,2}$ has been selected, the selection being effected by actuating the second from the top switch $SW_X$ to cause its X-lines to be connected to the measuring line 202 (rather to the neutralizing line 210), and actuating the second from the right switch $SW_Y$ to cause its Y-lines to be connected to a common reference potential, in this case ground, rather than to the neutralizing line 210.

It will be assumed that bistable device 206 is in the condition wherein its output is in the "high" state. Thus, this high potential is applied from the output of device 206 via resistor 202 and measuring line 210 to one side of the selected capacitor $C_{2,2}$, the opposite side of the capacitor being connected to ground. The selected capacitor $C_{2,2}$ thus starts to charge to the high level of the output of bistable device 206. The instantaneous voltage on the selected capacitor $C_{2,2}$ is applied via measuring line 202 and buffer amplifier 200 to the input of bistable device 206, so that the input of that device starts to rise. When it reaches the threshold level of its high output, device 206 quickly switches to its other bistable condition wherein its output is "low". This low output of bistable device 206 is now applied to the selected capacitor $C_{2,2}$, via resistor 212, and measuring line 202, in the same manner as described above, so as to discharge the capacitor.

Computer 208 measures one (or more) of the charge-discharge periods of the selected capacitor, and thereby provides a measurement of its capacitance. After the capacitance of one capacitor has been thus measured, computer 208 actuates the switches $SW_X$, $SW_Y$ to select the next capacitor whose capacitance is measured.

It is to be noted that during the charging of the selected capacitor, both sides of all the capacitors, except those in the selected Y-line, are connected to the neutralizing line 210. Since the opposite sides of these capacitors are at the same potential, they do not receive any charge.

In the selected Y-line, however, the selected capacitor ($C_{2,2}$) is connected at one side to ground, and at the other side to the output of bistable device 206 via resistor 212 and measuring line 202. The selected capacitor will therefore charge during the charging cycle, and discharge during the discharge cycle, by the potential at the output of bistable device 206 via resistor 212.

With respect to the non-selected capacitors in the selected Y-line, one side of each such capacitor is also connected to ground via the selected switch $SW_Y$. However, the opposite side of each such non-selected capacitor in the selected Y-line is connected to the neutralizing line 210, which line is isolated from the measuring line 202 by the buffer amplifier 200. Since buffer amplifier 200 has a very high input impedance, the potential applied to the non-selected capacitors does not affect the charging time or discharging time of the selected capacitor via resistor 212, and therefore when bistable device 206 switches to its other stable state, this will provide a true measurement of the charging or discharging time only of the selected capacitor.

It will be appreciated that the line-selector circuit illustrated in FIG. 5 may be used for measuring parameters of other electrical devices in an electrical matrix, for example the resistances of resistors. The provision of the unity-gain, high input impedance buffer amplifier, which transmits the potential from the measuring line to the neutralizing line but interposes a high impedance therebetween, enables any components of the matrix to be selected electrically without cross-talk from the other components of the matrix, and without having to physically isolate the components from the others of the matrix.

The above-described transducer may be used not only for measuring stress distribution as in the known foam-rubber transducer described earlier, but its advantageous characteristics enable it to be used in many more applications, including the following: sheets, mattresses, mats or pads for hospital beds or invalid chairs to indicate pressure distribution over the back or buttocks of an invalid in order to monitor the possibility of the development of pressure sores; lining or padding of storage shelves or other storage surfaces for inventory control by providing a measurement of the quantity of the items being stored according to weight; intrusion detection devices providing an indicating of an attempted intrusion by sensing weight; lining or padding elevator floors or other surfaces to monitor maximum weight; and signature verifying devices to verify a person's signature not only statically by the signature pattern, but also dynamically by the pattern of forces applied while applying the signature.

Many other variations, modifications and applications of the invention will be apparent.

What is claimed is:

1. A surface-area-pressure transducer comprising:
    at least one pair of electrode layers each including a plurality of electrically-conductive elements, the elements of one layer extending in spaced, crossing relationship to the elements of the other layer;
    and a compressively-deformable dielectric layer interposed between the two electrode layers to define therewith an array of capacitors whose capacitances are changed by the compression of said dielectric layer when subjected to pressure;
    characterized in that said dielectric layer is composed of fibers selected from the group consisting of nylon, glass and paper.

2. The transducer according to claims 1, wherein said fibers are in woven form in said dielectric layer.

3. The transducer acording to claim 1, wherein said fibers are of nylon.

4. The transducer according to claim 1, wherein said fibers are of glass.

5. The transducer according to any one of claims 1-2, wherein said fibers are of paper.

6. The transducer according to claim 1, wherein there are more than two of said electrode layers in stacked relationship, each electrode layer being separated from the next adjacent one by one of said compressively-deformable dielectric layers, the corresponding electrodes of alternating layers being connected together.

7. The transducer according to claim 1, wherein said electrically-conductive elements in said electrode layers are strips of metal foil bonded in said spaced, crossing relationship.

8. The transducer according to claim 1, wherein said electrically-conductive elements in said electrode layers are electrically-conductive coatings applied in said spaced, crossing relationship.

9. The transducer according to claim 1, wherein each of said electrode layers comprises a weave of a plurality of threads extending in one direction interlaced with a plurality of threads extending in another direction, at least some of said threads in said one direction in each electrode layer including electrically-conductive material and constituting said electrically-conductive elements of the respective electrode layer, the remaining threads of said electrode layers being of electrically-insulating material.

10. The transducer according to claim 9, wherein said electrically-conductive threads are metal threads mutually insulated from each other.

11. The transducer according to claim 1, said transducer further including a group of X-lines each connected to one side of each capacitor, and a group of Y-lines each connected to the opposite side of each capacitor to define a matrix of cross-over points between the two groups of lines; and a selector circuit selectively connecting the individual capacitors of the array of capacitors to a measuring device, comprising:
    a bistable device switchable to provide a high voltage output or a low voltage output;
    a high input impedance device connected to the input of said bistable device;
    a measuring line connected to the input side of said high input impedance device;
    a neutralizing line connected to the output side of said high input impedance device between same and said bistable device;
    a capacitor charging-discharging circuit connected between the output of said bistable device and the measuring line at its connection to the high input impedance device;
    a capacitance measuring circuit connected to said capacitor charging-discharging circuit;
    and selective switching means including an X-switch in each of said X-lines and a Y-switch in each of said Y-lines;
    each of said X-switches normally connecting all said X-lines to said neutralizing line but effective to connect the X-line of a selected capacitor to the measuring line;
    each of said Y-switches normally connecting all said Y-lines to said neutralizing line but effective to connect the Y-line of the selected capacitor to a reference potential.

12. The transducer according to claim 11, wherein said high input impedance device is a buffer amplifier having a gain of "1".

13. The transducer according to claim 12, wherein said reference potential is ground.

14. The transducer according to claim 11, wherein said bistable device is a Schmidt trigger.

15. A selector circuit for individually measuring an electrical parameter of any one of a plurality of electrical devices in a matrix including a group of X-lines each connected to one side of each electrical device, and a group of Y-lines each connected to the opposite side of each electrical device to define a matrix of cross-over points between the two groups of lines; and a selector circuit selectively connecting the individual electrical devices of the array of electrical devices to a measuring device, comprising:
    a bistable device switchable to provide a high voltage output or a low voltage output;
    a high input impedance device connected to the input of said bistable device;
    a measuring line connected to the input side of said high input impedance device;
    a neutralizing line connected to the output side of said high input impedance device between same and said bistable device;
    an electrical measuring circuit connected between the output of said bistable device and the measuring line at its connection to the high input impedance device;
    and selective switching means including an X-switch in each of said X-lines and a Y-switch in each of said Y-lines;
    each of said X-switches normally connecting all said X-lines to said neutralizing line but effective to connect the X-line of a selected electrical device to the measuring line;
    each of said Y-switches normally connecting all said Y-lines to said neutralizing line but effective to connect the Y-line of the selected electrical device to a reference potential.

16. The selector circuit according to claim 15, wherein said high impedance device comprises a buffer amplifier having a gain of "1".

17. The selector circuit according to claims 15, wherein said reference potential is ground.

18. The selector circuit according to claim 15, wherein said electrical devices are capacitors, and said measuring circuit is a capacitor charging-discharging circuit.

19. The circuit according to claim 15, wherein said bistable device is a Schmidt trigger.

* * * * *